(12) United States Patent
Lopez

(10) Patent No.: US 9,175,154 B2
(45) Date of Patent: Nov. 3, 2015

(54) TIRE OF WHICH THE TREAD COMPRISES A THERMOPLASTIC VULCANIZATE (TPV) ELASTOMER

(75) Inventor: Béatrice Lopez, Clermont-Ferrand Cedex (FR)

(73) Assignees: COMPAGNIE GENERALE DES ETABLISSEMENTS MICHELIN, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 180 days.

(21) Appl. No.: 13/697,781

(22) PCT Filed: May 4, 2011

(86) PCT No.: PCT/EP2011/057087
§ 371 (c)(1),
(2), (4) Date: Jan. 25, 2013

(87) PCT Pub. No.: WO2011/141334
PCT Pub. Date: Nov. 17, 2011

(65) Prior Publication Data
US 2013/0158172 A1    Jun. 20, 2013

(30) Foreign Application Priority Data
May 10, 2010   (FR) ..................... 10 53638

(51) Int. Cl.
| | |
|---|---|
| *C08L 9/06* | (2006.01) |
| *B60C 1/00* | (2006.01) |
| *C08L 21/00* | (2006.01) |
| *C08L 47/00* | (2006.01) |
| *C08K 3/00* | (2006.01) |
| *C08K 3/04* | (2006.01) |
| *C08K 3/36* | (2006.01) |
| *C08K 5/00* | (2006.01) |
| *C08L 9/00* | (2006.01) |
| *C08L 23/12* | (2006.01) |
| *C08L 23/16* | (2006.01) |

(52) U.S. Cl.
CPC ............... *C08L 9/06* (2013.01); *B60C 1/0016* (2013.04); *C08L 21/00* (2013.01); *C08L 47/00* (2013.01); *C08K 3/0033* (2013.01); *C08K 3/04* (2013.01); *C08K 3/36* (2013.01); *C08K 5/0016* (2013.01); *C08L 9/00* (2013.01); *C08L 23/12* (2013.01); *C08L 23/16* (2013.01)

(58) Field of Classification Search
CPC ........ C08L 23/12; C08L 23/16; B60C 1/0016
USPC .................................... 524/109, 526
See application file for complete search history.

(56) References Cited

U.S. PATENT DOCUMENTS

| | | | |
|---|---|---|---|
| 4,130,535 A * | 12/1978 | Coran et al. ................. | 524/487 |
| 8,344,063 B2 | 1/2013 | Marechal et al. | |
| 2006/0014903 A1 | 1/2006 | Vromman | |
| 2006/0100381 A1 | 5/2006 | Hoywweghen | |
| 2008/0009564 A1 * | 1/2008 | Robert et al. ................. | 523/351 |
| 2009/0275703 A1 * | 11/2009 | Alvarez Grima et al. .... | 525/194 |
| 2011/0172365 A1 | 7/2011 | Meredith et al. | |

FOREIGN PATENT DOCUMENTS

| | | |
|---|---|---|
| CN | 101597407 | 12/2009 |
| EP | 1 369 454 | 12/2003 |
| FR | 2 889 538 | 2/2007 |
| JP | 09-286050 | 11/1997 |
| JP | 2007-522299 | 8/2007 |
| JP | 2008-544075 | 12/2008 |
| JP | 2009-520092 | 5/2009 |
| WO | WO 2004/065140 | 8/2004 |
| WO | WO 2007/071619 | 6/2007 |
| WO | WO 2008/141702 | 11/2008 |
| WO | WO 2009/062733 | 5/2009 |
| WO | WO 2010/039327 | 4/2010 |

* cited by examiner

*Primary Examiner* — Wenwen Cai
(74) *Attorney, Agent, or Firm* — Cozen O'Connor

(57) ABSTRACT

A tire, the tread of which comprises a rubber composition comprising at least a diene elastomer, such as for example, an SBR or BR elastomer, a thermoplastic elastomer vulcanizate of EPDM and polypropylene, at a content preferably of greater than 5 phr, and a reinforcing filler, such as silica and/or carbon black. Such a composition confers, on the tire, an improvement in the wet grip.

7 Claims, No Drawings

TIRE OF WHICH THE TREAD COMPRISES A THERMOPLASTIC VULCANIZATE (TPV) ELASTOMER

RELATED APPLICATIONS

This is a U.S. National Phase Application under 35 USC 371 of International Application PCT/EP2011/057087 filed on May 4, 2011.

This application claims the priority of French application no. 10/53638 filed May 10, 2010, the entire content of which is hereby incorporated by reference.

FIELD OF THE INVENTION

The present invention relates to tire treads and to rubber compositions based on a diene elastomer and on a thermoplastic elastomer which can be used in the manufacture of such tire treads.

BACKGROUND OF THE INVENTION

In a known way, a tire has to meet a large number of often conflicting technical requirements, including a high wear resistance, a low rolling resistance and both a high dry grip and a high wet grip.

This compromise in properties, in particular from the viewpoint of the rolling resistance and the grip, was able to be improved in recent years with regard to energy-saving Green Tires, intended in particular for passenger vehicles, by virtue in particular of the use of novel weakly hysteretic rubber compositions having a characteristic of being reinforced predominantly with specific inorganic fillers, described as reinforcing, in particular of highly dispersible silicas, referred to as "HDS" (Highly Dispersible Silica), capable of rivalling, from the viewpoint of the reinforcing power, conventional tire-grade carbon blacks.

Improving the wet grip properties of tires remains, however, a constant preoccupation of designers of tires.

SUMMARY OF THE INVENTION

One object of the invention is to provide a novel rubber composition, based on a diene elastomer, on a specific thermoplastic elastomer vulcanizate (TPV) and on a reinforcing filler, which makes it possible to obtain tire treads exhibiting a better level of wet grip, with in addition improved processability in the raw state.

Thus, one aspect of the invention relates to a tire, the tread of which comprises a rubber composition comprising at least a diene elastomer, a reinforcing filler and a thermoplastic elastomer vulcanizate of EPDM and polypropylene.

The tires of the invention are intended in particular to equip passenger motor vehicles, SUV (Sports Utility Vehicle) vehicles, two-wheel vehicles (in particular motorcycles), aircraft, as well as industrial vehicles chosen from vans, heavy-duty vehicles—that is to say, underground, bus, heavy road transport vehicles (lorries, tractors, trailers) or off-road vehicles, such as agricultural vehicles or earth-moving equipment—or other transportation or handling vehicles.

The invention and its advantages will be easily understood in the light of the description and implementation examples which follow.

I—Measurements and Tests Used

The rubber compositions used in the tires according to the invention are characterized, before and after curing, as indicated below.

I-1. Mooney Plasticity:

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton·meter).

I-2. Tensile Tests

These tensile tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after a cycle of accommodation to the degree of extension expected for the measurement itself) at 10% elongation (denoted MA10) and at 100% elongation (denoted MA100). All these tensile measurements are carried out under the standard conditions of temperature (23±2° C.) and hygrometry (50±5% relative humidity), according to French Standard NF T 40-101 (December 1979).

I-3. Shore A Hardness

The Shore A hardness of the compositions after curing is assessed in accordance with Standard ASTM D 2240-86.

I-4. Dynamic Properties

The dynamic properties are measured on a viscosity analyser (Metravib VA4000) according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, during a temperature sweep, under a stationary stress of 0.7 MPa, is recorded; the tan(δ) value observed at 0° C. is recorded.

It should be remembered that, in a way well known to a person skilled in the art, the tan(δ)$_{0° C.}$ value is representative of the wet grip potential: the higher tan(δ)$_{0° C.}$, the better the grip.

II—Conditions for the Implementation of Embodiments of the Invention

"phr" means parts by weight per hundred parts of total elastomer, thus including the thermoplastic elastomer vulcanizate of EPDM and polypropylene.

In the present description, unless expressly indicated otherwise, all the percentages (%) shown are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

The tread of the tire according to an embodiment of the invention comprises an elastomer composition comprising at least a diene elastomer, a reinforcing filler and a thermoplastic elastomer vulcanizate of EPDM and polypropylene, which components are described in detail below.

II.1—Diene Elastomer

The tread of the tire according to an embodiment of the invention comprises a rubber composition which has the essential first characteristic of comprising at least one diene elastomer.

It should be remembered here that elastomer (or "rubber", the two terms being regarded as synonyms) of the "diene"

type should be understood as meaning, in a known way, an (one or more are understood) elastomer resulting at least in part (i.e., a homopolymer or a copolymer) from diene monomers (monomers carrying two carbon-carbon double bonds, which may or may not be conjugated).

The diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (molar %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystirenes, chlorostirenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol functional groups or polysiloxane functional groups having a silanol end (such as described, for example, in FR 2 740 778, U.S. Pat. No. 6,013,718 and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909, U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/stirene copolymers and in particular those having a Tg (glass transition temperature, measured according to ASTM D3418) of between 0° C. and −70° C. and more particularly between −10° C. and −60° C., a stirene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/stirene copolymers, in particular those having a stirene content of between 5% and 50% by weight and a Tg of between −5° C. and −50° C. In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/stirene/isoprene copolymer having a Tg of between −5° C. and −70° C., are suitable in particular.

To sum up, the diene elastomer of the composition in accordance with the invention is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/stirene copolymers (SBR), isoprene/butadiene copolymers (BIR), isoprene/stirene copolymers (SIR) and isoprene/butadiene/stirene copolymers (SBIR).

According to a specific embodiment, the composition comprises from 40 to 100 phr of an SBR elastomer, whether an SBR prepared in emulsion ("ESBR") or an SBR prepared in solution ("SSBR").

According to another specific embodiment, the diene elastomer is an SBR/BR blend (mixture).

According to other possible embodiments, the diene elastomer is an SBR/NR (or SBR/IR), BR/NR (or BR/IR) or SBR/BR/NR (or SBR/BR/IR) blend.

In the case of an SBR (ESBR or SSBR) elastomer, use is made in particular of an SBR having a moderate stirene content, for example of between 20% and 35% by weight, or a high stirene content, for example from 35% to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the diene elastomer is an isoprene elastomer. The term "isoprene elastomer" is understood to mean, in a known way, an isoprene homopolymer or copolymer, in other words a diene elastomer chosen from the group consisting of natural rubber (NR), which may be plasticized or peptized, synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to another specific embodiment of the invention, the rubber composition comprises, for example, between 30 and 90 phr, in particular between 40 and 90 phr, of a high Tg elastomer as a blend with a low Tg elastomer.

According to another specific embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomer(s)).

The compositions of the invention can comprise a single diene elastomer or a mixture of several diene elastomers.

II.2—Thermoplastic Elastomer Vulcanizate of EPDM and Polypropylene

The tread of the tire according to the invention comprises a rubber composition which has the other essential characteristic of comprising a thermoplastic elastomer vulcanizate (TPV) of EPDM and propylene.

The above TPV elastomers consist in a known way, of mixtures of EPDM and polypropylene, in part vulcanized, hence their name of vulcanizate; methods for manufacture thereof are known and have been described, for example, in the documents U.S. Pat. No. 3,806,558 A and GB 1 830 884.

These TPV elastomers are available commercially, for example sold by ExxonMobil Chemical under the "Santoprene" name.

The known applications thereof are motor vehicle parts, industry and construction, seals and packings made of plastic, wire and cable insulation, and the like.

The rubber composition preferably comprises more than 5 phr of a thermoplastic elastomer vulcanizate of EPDM and polypropylene, preferably between 5 and 50 phr of such a TPV elastomer, in particular from 10 to 30 phr.

II.3—Reinforcing Filler

Use may be made of any type of reinforcing filler known for its capabilities of reinforcing a rubber composition which can be used for the manufacture of tires, for example an organic filler, such as carbon black, a reinforcing inorganic filler, such as silica, or a mixture of these two types of filler, in particular a mixture of carbon black and silica.

All carbon blacks, in particular "tire-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of the functionalized polyvinyle organic fillers as described in Applications WO-A-2006/069792, WO-A-2006/069793, WO-A-2008/003434 and WO-A-2008/003435.

The term "reinforcing inorganic filler" should be understood, in the present patent application, by definition, as meaning any inorganic or mineral filler (whatever its colour and its origin, natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HDS") precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16837.

The reinforcing inorganic filler used, in particular if it is silica, preferably has a BET specific surface of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 150 phr.

According to a preferred embodiment of the invention, use is made of a reinforcing filler comprising between 50 and 120 phr of inorganic filler, particularly silica, and optionally carbon black; the carbon black, when it is present, is more preferably used at a content of less than 20 phr, more preferably still of less than 10 phr (for example, between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (I):

$$Z-A-S_x-A-Z, \qquad (I)$$

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$ alkylenes, especially propylene);
Z corresponds to one of the formulae below:

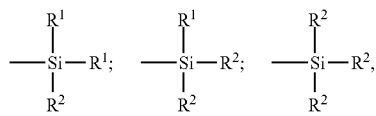

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl).
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl),
are suitable in particular, without the above definition being limiting.

In the case of a mixture of alkoxysilane polysulphides corresponding to the above formula (I), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula I), such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr, more preferably between 4 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.4—Various Additives

The rubber compositions of the treads of the tires in accordance with the invention also comprise all or a portion of the usual additives generally used in elastomer compositions intended for the manufacture of treads, such as, for example, pigments, protection agents, such as antiozone waxes, chemical antiozonants, antioxidants, plasticizing agents other than those mentioned above, antifatigue agents, reinforcing resins, methylene acceptors (for example, phenolic novolac resin) or methylene donors (for example, HMT or H3M), a crosslinking system based either on sulphur or on sulphur donors and/or on peroxide and/or on bismaleimides, vulcanization accelerators or vulcanization activators.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their processing property in the raw state, these agents being, for example, hydrolysable silanes, such as alkylalkoxysilanes, polyols, polyethers, primary, secondary or tertiary amines, or hydroxylated or hydrolysable polyorganosiloxanes.

According to a preferred embodiment, the composition of the tread of the tire according to the invention additionally comprises a plasticizing agent. Preferably, this plasticizing agent is a solid hydrocarbon resin, a liquid plasticizer or a mixture of the two.

The content of total plasticizing agent is preferably greater than 10 phr, more preferably between 10 and 100 phr, in particular between 20 and 80 phr, for example between 20 and 70 phr.

According to a first preferred embodiment of the invention, the plasticizer is a plasticizer which is liquid at 20° C., referred to as "low Tg" plasticizer, that is to say which by definition, exhibits Tg of less than −20° C., preferably less than −40° C.

Any extending oil, whether it is aromatic or nonaromatic in nature, any liquid plasticizing agent known for its plasticizing properties with regard to diene elastomers, can be used. At ambient temperature (20° C.), these plasticizers or these oils, which are more or less viscous, are liquid (that is to say, substances having the ability to eventually assume the shape of their container), in contrast in particular to hydrocarbon plasticizing resins, which are by nature solid at ambient temperature.

Suitable in particular are the liquid plasticizers chosen from the group consisting of naphthenic oils (of low or high viscosity, in particular which are or are not hydrogenated), paraffinic oils, MES (Medium Extracted Solvates) oils, TDAE (Treated Distillate Aromatic Extracts) oils, mineral oils, vegetable oils, ether plasticizers, ester plasticizers, phosphate plasticizers, sulphonate plasticizers and the mixtures of these compounds.

Mention may be made, as phosphate plasticizers, for example, of those which comprise between 12 and 30 carbon atoms, for example trioctyl phosphate. Mention may in particular be made, as examples of ester plasticizers, of the compounds chosen from the group consisting of the trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly (for more than 50% by weight, more preferably for more than 80% by weight) composed of a $C_{18}$ unsaturated fatty acid, that is to say chosen from the group consisting of oleic acid, linoleic acid, linolenic acid and the mixtures of these acids. More preferably, whether of synthetic origin or natural origin (case, for example, of sunflower or rapeseed vegetable oils), the fatty acid used is composed for more than 50% by weight, more preferably still for more than 80% by weight, of oleic acid. Such triesters (trioleates) having a high content of oleic acid are well known; they have been described, for example, in Application WO 02/088238, as plasticizing agents in treads for tires.

Preferably, the content of liquid plasticizer is between 5 and 50 phr, more preferably between 10 and 40 phr and more preferably still between 10 and 35 phr.

According to another preferred embodiment of the invention, this plasticizing agent is a thermoplastic hydrocarbon resin, the Tg of which is greater than 0° C., preferably greater than +20° C. This resin is a solid at ambient temperature (23° C.), in contrast to a liquid plasticizing compound, such as an oil.

Preferably, the thermoplastic hydrocarbon plasticizing resin exhibits at least any one of the following characteristics:
  a Tg of greater than 20° C., more preferably of greater than 30° C.;
  a number-average molecular weight (Mn) of between 400 and 2000 g/mol, more preferably between 500 and 1500 g/mol;
  a polydispersity index (PI) of less than 3, more preferably of less than 2 (reminder: PI=Mw/Mn, with Mw the weight-average molecular weight).

More preferably, this thermoplastic hydrocarbon plasticizing resin exhibits all of the preferred characteristics above.

The macrostructure (Mw, Mn and PI) of the hydrocarbon resin is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

The thermoplastic hydrocarbon resins can be aliphatic or aromatic or of the aliphatic/aromatic type, that is to say based on aliphatic and/or aromatic monomers. They can be natural or synthetic, based or not based on oil (if such is the case, also known under the name of petroleum resins).

Stirene, α-methylstirene, ortho-, meta- or para-methylstirene, vinyltoluene, para-(tert-butyl)stirene, methoxystirenes, chlorostirenes, vinylmesitylene, divinylbenzene, vinylnaphthalene and any vinylaromatic monomer resulting from a $C_9$ fraction (or more generally from a $C_8$ to $C_{10}$ fraction), for example, are suitable as aromatic monomers. Preferably, the vinylaromatic monomer is stirene or a vinylaromatic monomer resulting from a $C_9$ fraction (or more generally from a $C_8$ à $C_{10}$ fraction). Preferably, the vinylaromatic monomer is the minor monomer, expressed as molar fraction, in the copolymer under consideration.

According to a particularly preferred embodiment, the plasticizing hydrocarbon resin is chosen from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstirene homopolymer or copolymer resins, and the mixtures of these resins, which can be used alone or in combination with a liquid plasticizer, for example an MES or TDAE oil.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Mention will in particular be made, among the above plasticizing hydrocarbon resins, of α-pinene, β-pinene or dipentene homo- or copolymer resins or polylimonene resins.

The preferred resins above are well known to a person skilled in the art and are commercially available, for example sold, as regards the:
  polylimonene resins: by DRT under the name "Dercolyte L120" (Mn=625 g/mol; Mw=1010 g/mol; PI=1.6; Tg=72° C.) or by Arizona Chemical Company under the name "Sylvagum TR7125C" (Mn=630 g/mol; Mw=950 g/mol; PI=1.5; Tg=70° C.);
  $C_5$ fraction/vinylaromatic copolymer resins, in particular $C_5$ fraction/stirene or $C_5$ fraction/$C_9$ fraction copolymer resin: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", of Exxon under the names "Escorez 2101" and "ECR 373";
  limonene/stirene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; Tg=53° C.); "Sylvares SA 120" (Mn=1030 g/mol; PI=1.9; Tg=64° C.); "Sylvares 540" (Mn=620 g/mol; PI=1.3; Tg=36° C.; hydroxyl number=56 mg KOH/g); and "Sylvares 600" (Mn=850 g/mol; PI=1.4; Tg=50° C.; hydroxyl number=31 mg KOH/g).

According to a specific embodiment of the invention, the content of hydrocarbon plasticizing resin is between 5 and 50 phr, preferably between 10 and 40 phr and more preferably still between 10 and 35 phr.

II.5—Preparation of the Rubber Compositions

The compositions used in the treads of the tires of the invention can be manufactured in appropriate mixers using two successive preparation phases well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase), up to a lower temperature, typically of less than 110° C., for example between 40° C. and 100° C., finishing phase during which the crosslinking system is incorporated.

The process for preparing such compositions comprises, for example, the following stages:
  incorporating, in a diene elastomer, during a first stage ("non-productive" stage), at least a reinforcing filler and a thermoplastic elastomer vulcanizate of EPDM and polypropylene, everything being kneaded thermomechanically (for example in one or more goes), until a maximum temperature of between 110° C. and 190° C. is reached;
  cooling the combined mixture to a temperature of less than 100° C.;
  subsequently incorporating, during a second stage ("productive" stage), a crosslinking system;
  kneading everything up to a maximum temperature of less than 110° C.

By way of example, the non-productive phase is carried out in a single thermomechanical stage during which, in a first step, all the necessary base constituents (the diene elastomer, the thermoplastic elastomer vulcanizate of EPDM and polypropylene, the reinforcing filler) are introduced into an appropriate mixer, such as a normal internal mixer, followed, in a second step, for example after kneading for one to two minutes, by the other additives, optional additional covering agents for the filler or processing aids, with the exception of the crosslinking system. The total duration of the kneading, in this non-productive phase, is preferably between 1 and 15 min.

After cooling the mixture thus obtained, the crosslinking system is then incorporated in an external mixer, such as an open mill, maintained at low temperature (for example between 40° C. and 100° C.). The combined mixture is then mixed (productive phase) for a few minutes, for example between 2 and 15 min.

The crosslinking system proper is preferably based on sulphur and on a primary vulcanization accelerator, in particular on an accelerator of the sulphonamide type. Additional to this vulcanization system are various known vulcanization activators or secondary vulcanization accelerators, such as zinc oxide, stearic acid, guanidine derivatives (in particular diphenylguanidine), and the like, incorporated during the first non-productive phase and/or during the productive phase. The sulphur content is preferably between 0.5 and 3.0 phr and the content of the primary accelerator is preferably between 0.5 and 5.0 phr.

Use may be made, as (primary or secondary) accelerator, of any compound capable of acting as accelerator for the vulcanization of diene elastomers in the presence of sulphur, in particular accelerators of the thiazole type and their derivatives or accelerators of thiuram or zinc dithiocarbamate type. These accelerators are more preferably chosen from the group consisting of 2-mercaptobenzothiazyl disulphide (abbreviated to "MBTS"), N-cyclohexyl-2-benzothiazole-sulphenamide (abbreviated to "CBS"), N,N-dicyclohexyl-2-benzothiazole-sulphenamide (abbreviated to "DCBS"), N-tert-butyl-2-benzothiazolesulphenamide (abbreviated to "TBBS"), N-tert-butyl-2-benzothiazolesulphenimide (abbreviated to "TBSI"), zinc dibenzyldithiocarbamate (abbreviated to "ZBEC") and the mixtures of these compounds. Preferably, a primary accelerator of the sulphonamide type is used.

The final composition thus obtained can subsequently be calendered, for example in the form of a sheet or of a plaque, in particular for characterization in the laboratory, or else extruded, for example to form a rubber profiled element used in the manufacture of a tread.

The invention relates to the tires described above both in the raw state (that is to say, before curing) and in the cured state (that is to say, after crosslinking or vulcanization).

III—Examples of the Implementation of the Invention

III.1—Preparation of the Compositions

The procedure for the tests which follow is as follows: the diene elastomer, the thermoplastic elastomer vulcanizate of EPDM and polypropylene in the case of a composition in accordance with the invention, the reinforcing filler (silica and/or carbon black) and the various other ingredients, with the exception of the vulcanization system, are successively introduced into an internal mixer (final degree of filling: approximately 70% by volume), the starting vessel temperature of which is approximately 60° C. Thermomechanical working is then carried out (non-productive phase) in one stage, which lasts in total approximately from 3 to 4 min, until a maximum "dropping" temperature of 165° C. is reached.

The mixture thus obtained is recovered and cooled, and then sulphur and an accelerator of sulphenamide type are incorporated on a mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a tread.

III.2—Tests

The tests which follow demonstrate the improvement in the wet grip performances of the compositions for the treads of the tires according to the invention, in comparison with a control tread.

For this, four rubber compositions for a tread were prepared as indicated above, three in accordance with the invention (denoted hereinafter C.2 to C.4) and one not in accordance with the invention (control composition, denoted hereinafter C.1).

Their formulations (in phr or parts by weight per hundred parts of total elastomer, thus including the thermoplastic elastomer vulcanizate of EPDM and polypropylene) and their mechanical properties before and after curing are presented in the appended Tables 1 and 2.

Composition C.1 is a reference composition for a person skilled in the art, based on SBR and BR, which is conventionally used to manufacture Green Tire treads for passenger vehicles.

Compositions C.2 to C.4 are based on SBR and BR and on a thermoplastic elastomer vulcanizate of EPDM and polypropylene. These compositions thus differ from the control composition C.1 only in the replacement of 10 phr of SBR and 10 phr of BR by 20 phr of TPV elastomer.

Compositions C.1 to C.4 all comprise a mixture of plasticizer comprising a hydrocarbon resin (polylimonene resin), a liquid plasticizer (glycerol oleic acid triester) and an MES oil.

It is noted first of all that compositions C.2 to C.4 exhibit a Mooney viscosity value which is substantially lower than that of the control composition C.1, which testifies to an improvement in the processability of the compositions in the raw state.

It is subsequently noted that compositions C.2 to C.4 exhibit, after curing, properties of stiffness (Shore A hardness) and of modulus at 10% strain and at 100% strain which are greater than to those of the control composition, which is a recognized indicator to a person skilled in the art of an improvement in the road behaviour (increased cornering force).

Finally, it is found that the compositions C.2 to C.4 of the treads of the tires according to the invention exhibit tan(δ) values at 0° C. which are always greater than that of the control composition C.1, a clear indicator to the person skilled in the art of a wet grip potential of the tire tread which is improved.

TABLE 1

| | Composition No. | | | |
|---|---|---|---|---|
| | C. 1 | C. 2 | C. 3 | C. 4 |
| SBR (1) | 54 | 44 | 44 | 44 |
| BR (2) | 46 | 36 | 36 | 36 |
| TPV 1 (3) | — | 20 | — | — |
| TPV 2 (4) | — | — | 20 | — |
| TPV 3 (5) | — | — | — | 20 |
| Filler (6) | 90 | 90 | 90 | 90 |
| Coupling agent (7) | 7.2 | 7.2 | 7.2 | 7.2 |
| Carbon black (8) | 4 | 4 | 4 | 4 |
| Plasticizers (9) | 40 | 40 | 40 | 40 |
| Antiozone wax | 1.5 | 1.5 | 1.5 | 1.5 |
| Antioxidant (10) | 2.2 | 2.2 | 2.2 | 2.2 |
| DPG (11) | 2.1 | 2.1 | 2.1 | 2.1 |
| ZnO (12) | 2 | 2 | 2 | 2 |
| Stearic acid (13) | 3 | 3 | 3 | 3 |
| CBS (14) | 1.6 | 1.6 | 1.6 | 1.6 |
| Sulphur | 1.4 | 1.4 | 1.4 | 1.4 |

(1) SSBR solution (content expressed as dry SBR: 25% of styrene, 57% of 1,2-polybutadiene units and 23% of trans-1,4-polybutadiene units (Tg = −21° C.);
(2) BR with 4.3% of 1,2-; 2.7% of trans-1,4-; 93% of cis-1,4- (Tg = −106° C.);
(3) EPDM/polypropylene: ("Santoprene TPV 111-45" from ExxonMobil Chemical);
(4) EPDM/polypropylene: ("Santoprene TPV 9101-55" from ExxonMobil Chemical);
(5) EPDM/polypropylene: ("Santoprene TPV 121-62M100" from ExxonMobil Chemical);
(6) Silica ("Zeosil 1165MP" from Rhodia);
(7) Coupling agent, TESTP ("Si69" from Degussa);
(8) Carbon black N234;
(9) Mixture of glycerol oleic acid triester "Lubrirob Tod 1880" from Novance), polylimonene resin ("Dercolyte L120" from DRT) and extending oil for SBR (MES);
(10) N-(1,3-Dimethylbutyl)-N-phenyl-para-phenylenediamine (Santoflex 6-PPD from Flexsys);
(11) DPG = diphenylguanidine ("Perkacit DPG" from Flexsys);
(12) Zinc oxide (industrial grade - Umicore);
(13) Stearin ("Pristerene" from Uniqema);
(14) N-Cyclohexyl-2-benzothiazolesulphenamide (Santocure CBS from Flexsys).

TABLE 2

| | Composition No. | | | |
|---|---|---|---|---|
| | C. 1 | C. 2 | C. 3 | C. 4 |
| Mooney viscosity | 63 | 55 | 60 | 61 |
| Shore A | 60 | 64 | 65 | 67 |
| MA 10 | 4.0 | 4.3 | 4.5 | 4.6 |
| MA 100 | 1.5 | 1.7 | 1.8 | 1.8 |
| Tan(δ) at 0° C. | 0.344 | 0.370 | 0.378 | 0.373 |

The invention claimed is:

1. A tire, the tread of which comprises a rubber composition comprising:
    a diene elastomer;
    a reinforcing filler; and
    a thermoplastic elastomer vulcanizate (TPV) of EPDM and polypropylene,
    wherein the diene elastomer is selected from the group consisting of polybutadienes (BR), butadiene/styrene copolymers (SBR), and a mixture thereof,
    wherein the reinforcing filler is selected from the group consisting of carbon black, silica, and a mixture thereof, and
    wherein the content of the TPV elastomer is between 10 and 50 phr.

2. The tire according to claim 1, wherein the rubber composition further comprises a plasticizing agent.

3. The tire according to claim 2, wherein the content of the plasticizing agent is greater than 10 phr.

4. The tire according to claim 2, wherein the plasticizing agent is a thermoplastic hydrocarbon resin, the glass transition temperature (Tg) of which is greater than 0° C.

5. The tire according to claim 4, wherein the thermoplastic hydrocarbon resin is selected from the group consisting of cyclopentadiene (abbreviated to CPD) homopolymer resin, CPD copolymer resin, dicyclopentadiene (abbreviated to DCPD) homopolymer resin, DCPD copolymer resin, terpene homopolymer resin, terpene copolymer resin, terpene/phenol copolymer resin, C5 fraction homopolymer resin, C5 fraction copolymer resin, C9 fraction homopolymer resin, C9 fraction copolymer resin, α methylstirene homopolymer resin, α methylstirene copolymer resin, and the mixtures of these resins.

6. The tire according to claim 2, wherein the plasticizing agent is liquid at 20° C. and has a glass transition temperature (Tg) of less than −20° C.

7. The tire according to claim 6, wherein the liquid plasticizing agent is selected from the group consisting of naphthenic oils, paraffinic oils, MES oils, TDAE oils, ester plasticizers, ether plasticizers, phosphate plasticizers, sulphonate plasticizers and the mixtures of these compounds.

* * * * *